(No Model.)

J. IDDON.
PNEUMATIC TIRE.

No. 511,698. Patented Dec. 26, 1893.

Witnesses
John Sanderson
Yates W. Booth

Inventor
James Iddon
by O. E. Duffy
Attorney

United States Patent Office.

JAMES IDDON, OF LEYLAND, ENGLAND.

PNEUMATIC TIRE.

SPECIFICATION forming part of Letters Patent No. 511,698, dated December 26, 1893.

Application filed June 8, 1893. Serial No. 476,929. (No model.) Patented in England November 21, 1892, No. 21,141; in France May 23, 1893, No. 230,284, and in Belgium June 15, 1893, No. 105,095.

*To all whom it may concern:*

Be it known that I, JAMES IDDON, a subject of the Queen of Great Britain and Ireland, residing at Leyland, near Preston, in the county of Lancaster, England, have invented Improvements in or relating to Pneumatic Tires, (for which I have obtained Letters Patent in Great Britain, No. 21,141, dated November 21, 1892; in France, No. 230,284, dated May 23, 1893, and in Belgium, No, 105,095, dated June 15, 1893,) of which the following is a specification.

This invention has reference to an improved method of fastening or securing a pneumatic tire to its wheel rim.

In carrying out the said invention I employ a curved sheet steel rim of the ordinary kind but formed with a central channel or groove the said channel being made wider at the bottom than at the top or in other words what is sometimes termed "undercut." The longitudinal edges of the outer rubber tube or covering of the tire are formed or provided with lips or projections (hereinafter termed lips) adapted to enter the groove or channel in the rim and so shaped that when the inner tube has been tightly inflated in the usual way the said lips will be thereby pressed against or under the undercut sides of the groove or channel so that the tire will become fastened or secured to the rim. To assist the operation just described the outer tube or covering is provided underneath the said lips with other lips, hereinafter termed "jointing lips," of soft rubber so arranged that the outward pressure of the inner tube when inflated not only makes a water tight joint between the adjoining edges of the outer tube or covering, but also has the tendency to press or distend the first mentioned lips outwardly against the undercut sides of the groove or channel. In order to give the said lips a stronger hold on the undercut sides of the groove or channel and at the same time provide or retain the required amount of elasticity to enable the outer covering to be stretched over or placed upon the rim I make the said lips in sections longitudinally that is to say in short lengths alternately of hard rubber or ebonite (vulcanized on to the outer covering) and ordinary soft or elastic rubber.

Figure 1:
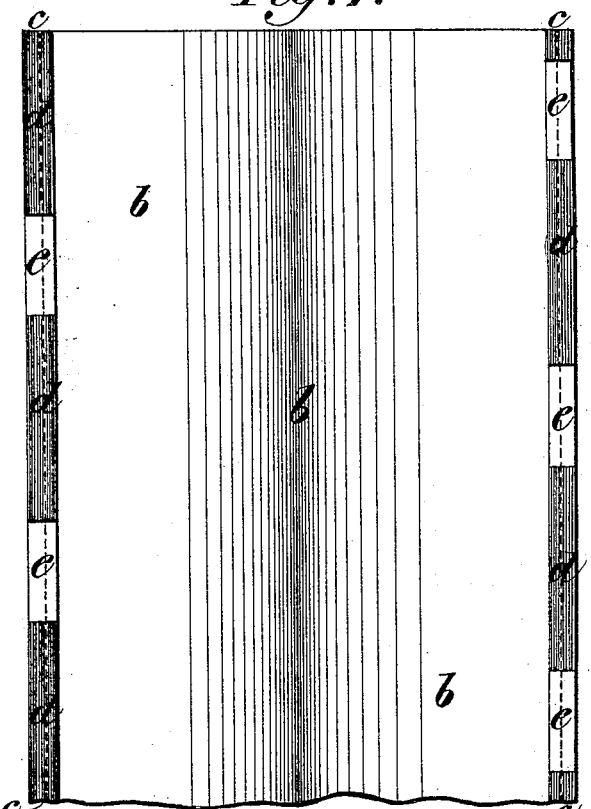
Figure 2:
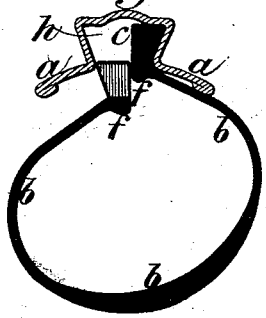
Figure 3:
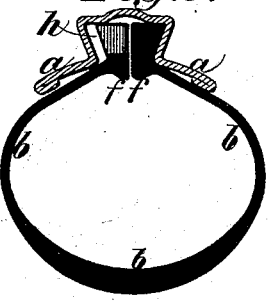
Figure 4:
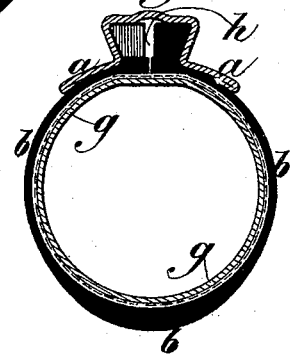

In the accompanying drawings, Figure 1 is a developed plan view designed to illustrate the alternate sections of hard and soft rubber constituting the lips applied to the edges of an outer covering of a pneumatic tire constructed according to my said invention. Figs. 2 and 3 are cross sectional views illustrating the mode of inserting the lips of the said outer covering into the channel or groove of a wheel rim as hereinbefore described, and Fig. 4 is another cross sectional view showing the effect on the lips on the said outer covering within the channel or groove of the rim, when the inner or air tube has been inflated. Figs. 2, 3 and 4 are drawn to a smaller scale than Fig. 1.

$a$ is the curved sheet steel rim having an undercut central channel or groove $h$.

$b$ is the outer covering having the lips $c\ c$ formed in alternate sections of hard rubber $d$ and soft rubber $e$ these sections being preferably made in lengths of about two inches of hard rubber to one inch of soft rubber. These lips in the example shown gradually increase in width resembling in cross section a wedge or a right angled triangle with one of the acute angles removed one side bearing an inclination corresponding to that of the corresponding side of the groove $h$.

$f\ f$ are the jointing lips of soft rubber, which, under the pressure of the inner tube $g$ when inflated, make a water-tight joint between the two adjoining edges of the lips $c\ c$ and thus prevent the ingress of water or dirt between the outer covering and the inner tube. (See Fig. 4). The pressure of the said lips $f\ f$ against each other also tends to press or distend the lips $c\ c$ outwardly, against the undercut sides of the groove or channel $h$.

I make the lips $c\ c$ of such size that the widest part of one lip and the narrowest part of the other lip are approximately together equal to the width of the opening of the channel or groove $h$ so that the lips require to be inserted one after the other as in Fig. 2 and cannot be withdrawn together.

I am aware that it is not new to employ a wheel rim having a dove-tailed groove or channel which receives or incloses the thickened edges of the outer covering of a pneumatic tire the inflation of the inner or air tube causing the adherence of the tire to the wheel rim and I therefore lay no claim broadly to such an arrangement.

What I claim is—

1. The combination of a wheel rim having an undercut channel or groove, an air tube, and an outer cover for said air tube, said cover having upturned lips adapted to engage in said channel or groove and each formed partly of hard rubber and partly of soft rubber in the direction of its length substantially as herein described for the purpose specified.

2. The combination of a wheel rim having an undercut groove, an air tube and an outer covering for said tube, said cover being provided on its outer side with lips adapted to engage in said undercut groove and on its inner side with jointing lips $f$, $f$, at the inner face of said first mentioned lips arranged to abut against each other substantially as herein described for the purpose specified.

3. The combination with a wheel rim having an undercut channel or groove, an air tube, and an outer cover for said air tube, of lips secured to the edges of said cover and each made in alternate sections or lengths of hard and soft rubber substantially as described.

4. The combination of the wheel rim $a$ with undercut groove or channel $h$, the inner air tube $g$, and the outer cover $b$ having lips on its outer side made up of sections $d$ of hard rubber and of sections $e$ of soft rubber, and jointing lips $f$ on its inner side, said groove or channel $h$ having an opening narrower than the combined width of said lips at their widest parts substantially as herein described for the purpose specified.

In testimony whereof I have signed my name to this specification in the presence of two subscribing witnesses.

JAMES IDDON.

Witnesses:
 JOHN SANDERSON,
59 *Fishergate Hill, Preston, Lancashire.*
 GATES W. BOOTH,
30 *Guildhall Street, Preston, Lancashire.*